(12) United States Patent
Morikawa

(10) Patent No.: US 7,403,480 B2
(45) Date of Patent: Jul. 22, 2008

(54) DATA COMMUNICATION TERMINAL FOR CONDUCTING DATA COMMUNICATION FOR A SET OF OBJECTIVE DATA TO BE TRANSMITTED/RECEIVED

(75) Inventor: Shigenori Morikawa, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 1264 days.

(21) Appl. No.: 09/991,774

(22) Filed: Nov. 5, 2001

(65) Prior Publication Data
US 2002/0054569 A1     May 9, 2002

(30) Foreign Application Priority Data
Nov. 7, 2000   (JP)  ............... 2000-339491

(51) Int. Cl.
*G01R 31/08* (2006.01)
*H04J 1/16* (2006.01)
*H04L 1/00* (2006.01)

(52) U.S. Cl. ............... 370/232; 370/252
(58) Field of Classification Search ............ 370/114.01, 370/223, 224, 30
See application file for complete search history.

(56) References Cited

U.S. PATENT DOCUMENTS

| | | | | |
|---|---|---|---|---|
| 5,539,747 A * | 7/1996 | Ito et al. ............... 370/235 |
| 5,577,100 A | 11/1996 | McGregor et al. |
| 5,677,945 A * | 10/1997 | Mullins et al. ......... 379/114.17 |
| 6,055,601 A | 4/2000 | Ogasawara |
| 6,115,613 A * | 9/2000 | Jonsson ............... 455/519 |
| 6,119,109 A * | 9/2000 | Muratani et al. ............ 705/400 |
| 6,137,872 A * | 10/2000 | Davitt et al. ............ 379/114.2 |
| 6,208,977 B1 * | 3/2001 | Hernandez et al. ............ 705/34 |
| 6,393,269 B1 * | 5/2002 | Hartmaier et al. .......... 455/406 |
| 6,453,029 B1 * | 9/2002 | Campbell ............... 379/114.2 |
| 6,463,139 B1 * | 10/2002 | Davitt et al. ........... 379/144.01 |
| 6,615,260 B1 * | 9/2003 | Honda et al. ............... 709/224 |
| 6,658,485 B1 * | 12/2003 | Baber et al. ............... 719/314 |
| 6,700,961 B1 * | 3/2004 | Dacloush et al. ......... 379/114.2 |
| 2002/0046277 A1 * | 4/2002 | Barna et al. ............... 709/224 |

FOREIGN PATENT DOCUMENTS

| | | |
|---|---|---|
| CN | 1222017 A | 7/1999 |
| DE | 197 55 870 A1 | 4/1999 |

(Continued)

*Primary Examiner*—Edan Orgad
*Assistant Examiner*—Blanche Wong
(74) *Attorney, Agent, or Firm*—Frishauf, Holtz, Goodman & Chick, P.C.

(57) ABSTRACT

A data communication terminal carries out data communication via a first communication network in which accounting is made according to a transmitted/received data amount, and via a second communication network in which accounting is made according to a connection time. The terminal calculates a communication charge according to the transmitted/received data amount of the data communication carried out via the first communication network, and according to the connection time of the data communication carried out via the second communication network. The terminal sets a communication charge limit amount for a set of objective data to be transmitted/received, selects one of the first and second communication networks to carry out data communication, calculates the communication charge for the data communication carried out by the selected one of the first and second communication networks, and judges whether the calculated charge has reached the communication charge limit amount to warn a user.

4 Claims, 9 Drawing Sheets

FOREIGN PATENT DOCUMENTS

| | | |
|---|---|---|
| JP | 57-159153 A | 10/1982 |
| JP | 7-162459 | 6/1995 |
| JP | 11-17693 A | 1/1999 |
| JP | 11-27261 A | 1/1999 |
| JP | 2000-36831 | 2/2000 |
| WO | WO 99/65183 A3 | 12/1999 |

* cited by examiner

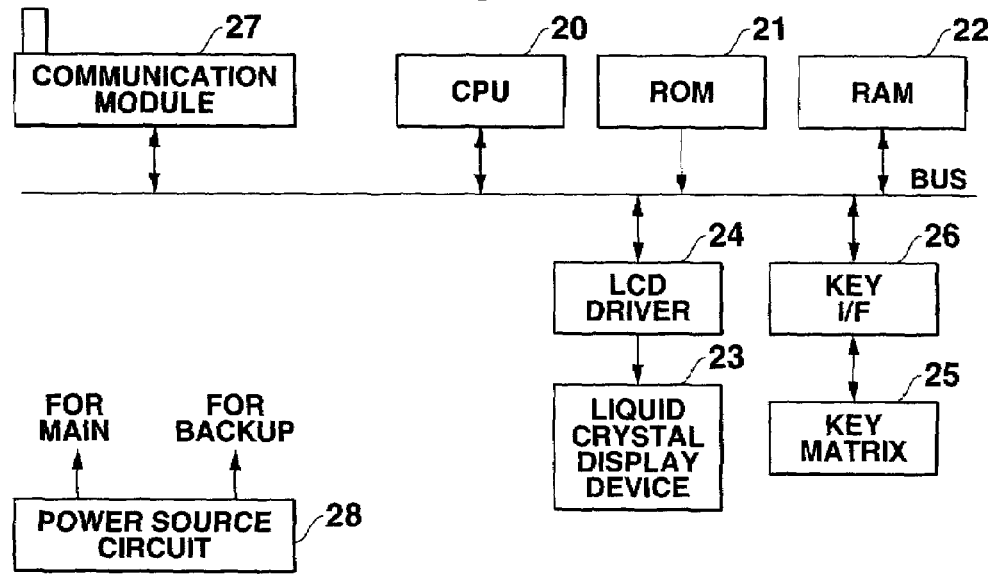

FIG.3A

CHARGE WARNING DISPLAY AND SETTING (OK) — 38

31 —

CHARGE PER PACKET : 0. [01] ▲▼ yen — 30

☑ CARRY OUT CHARGE WARNING DURING COMMUNICATION

SPECIFIED WARNING MONEY AMOUNT: [9999] ▲▼ yen (124,987.5KB) — 32

CURRENT CHARGE : 4,300 yen (53,750.0KB) — 33

[RESET] — 34

PREVIOUS CHARGE :999,999 yen (12,499,988.0KB) — 35
(PERIOD MAY 30 TO JULY 1) — 36

SOFT KEYBOARD DISPLAY FOR ALPHANUMERIC ENTRY — 37

FIG.3B

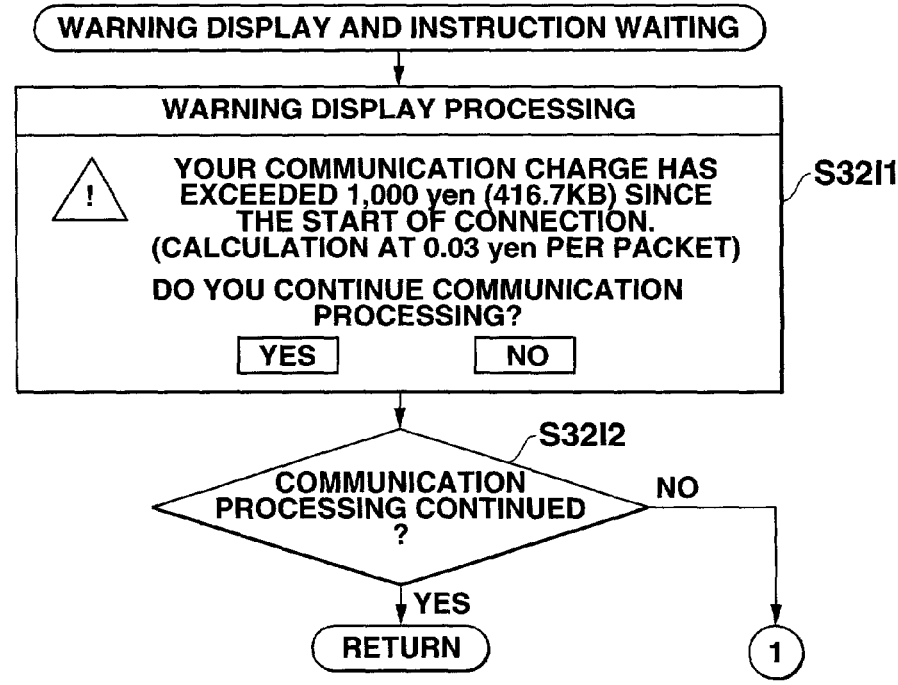

( WARNING DISPLAY AND INSTRUCTION WAITING )

WARNING DISPLAY PROCESSING

⚠ YOUR COMMUNICATION CHARGE HAS EXCEEDED 1,000 yen (416.7KB) SINCE THE START OF CONNECTION.
(CALCULATION AT 0.03 yen PER PACKET)

DO YOU CONTINUE COMMUNICATION PROCESSING?

[YES]  [NO]

— S32I1

S32I2 — COMMUNICATION PROCESSING CONTINUED ?
— NO → (1)
— YES → ( RETURN )

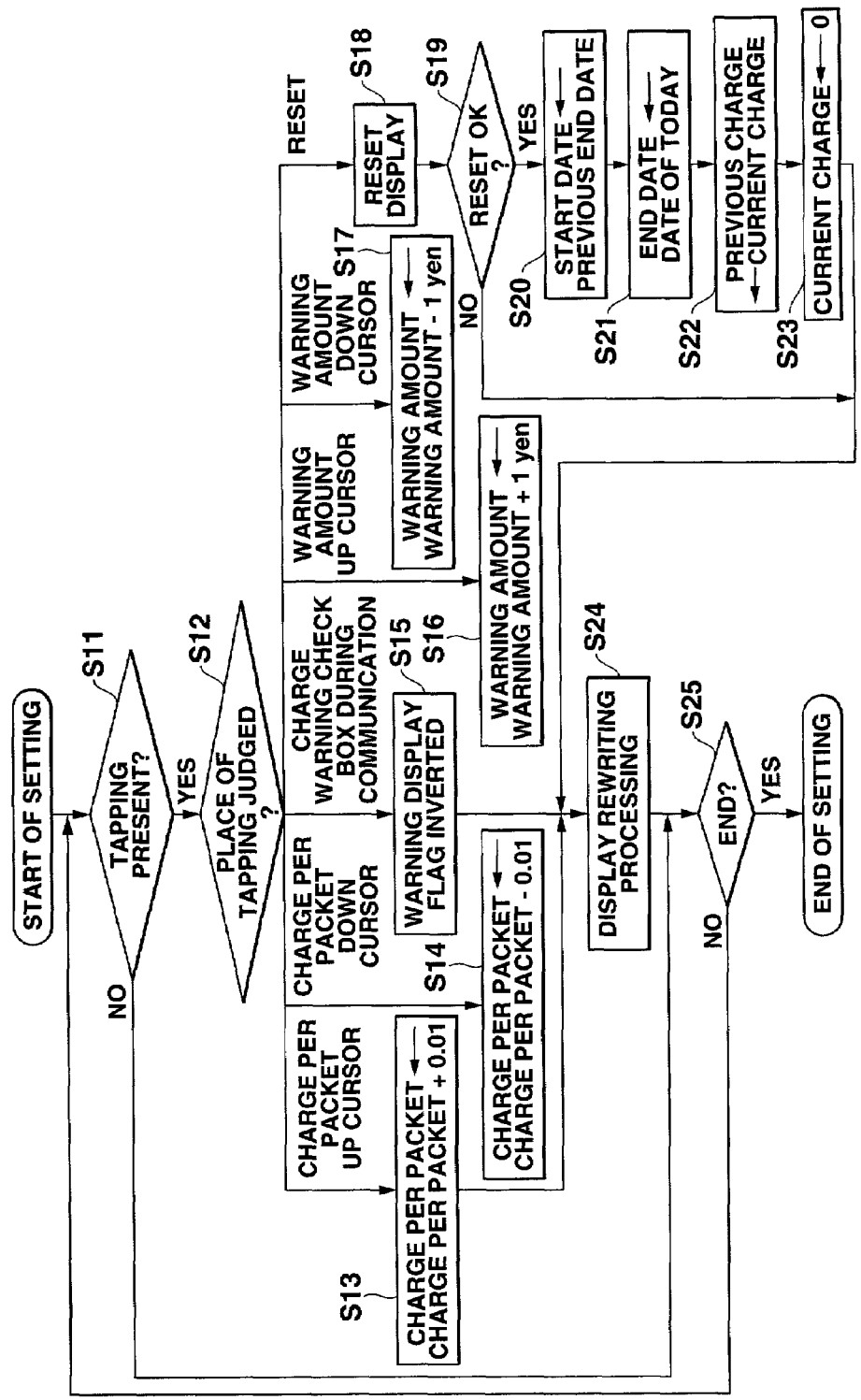

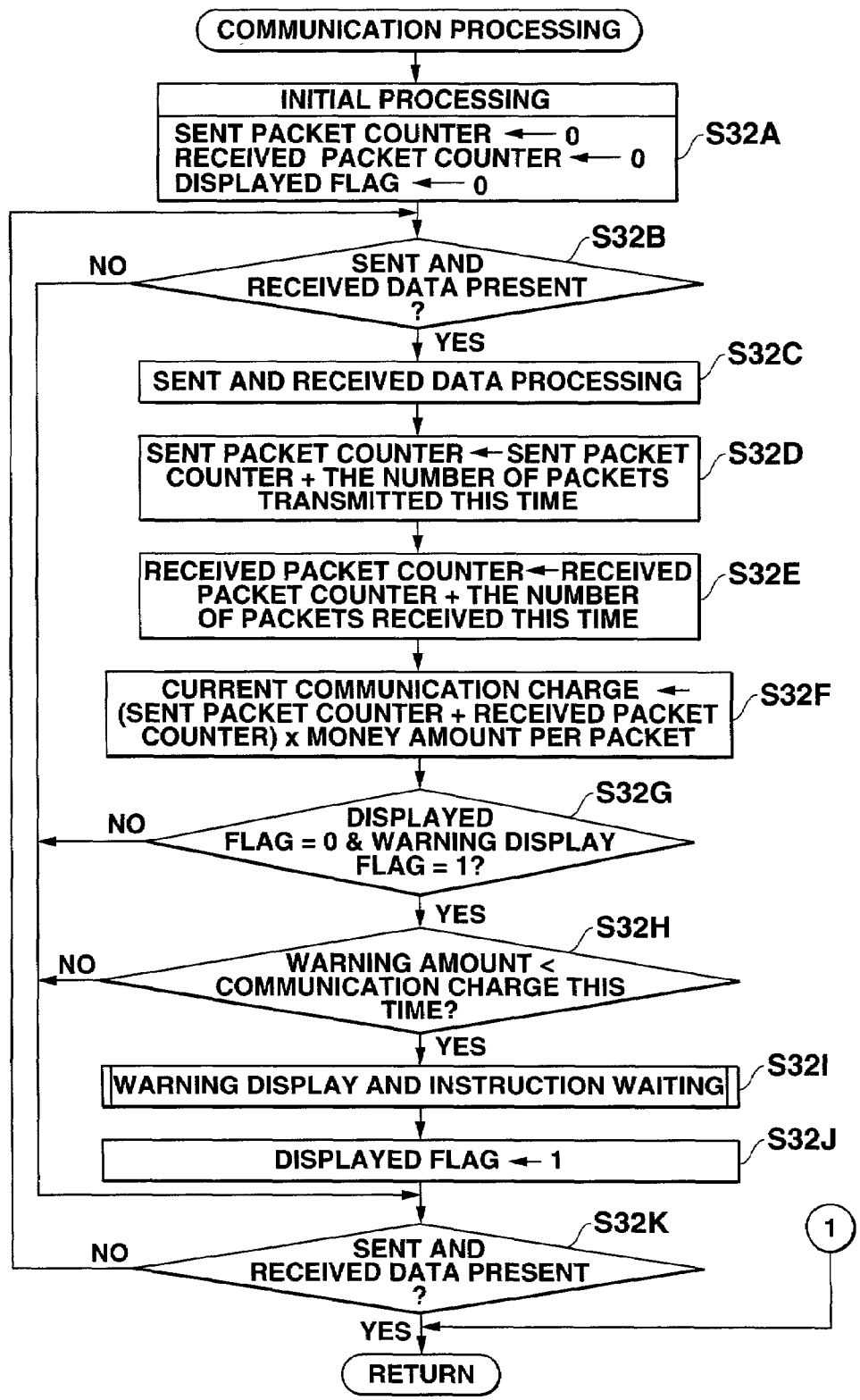

FIG.6A

| CHARGE PER UNIT TIME | /22M

FIG.6B

22a AVAILABLE COMMUNICATION
NETWORK CONTROL TABLE

| CONNECTION DESTINATION | AVAILABLE COMMUNICATION NETWORK | ACCOUNTING METHOD |
|---|---|---|
| CONNECTION DESTINATION A | PACKET COMMUNICATION NETWORK A | 0.4 yen/ PACKET |
| CONNECTION DESTINATION B | AUDIO COMMUNICATION NETWORK A | 40 yen/ 3 MINUTES |
| CONNECTION DESTINATION C | AUDIO COMMUNICATION NETWORK A | 25 yen/ 3 MINUTES |
| ⋮ | ⋮ | ⋮ |

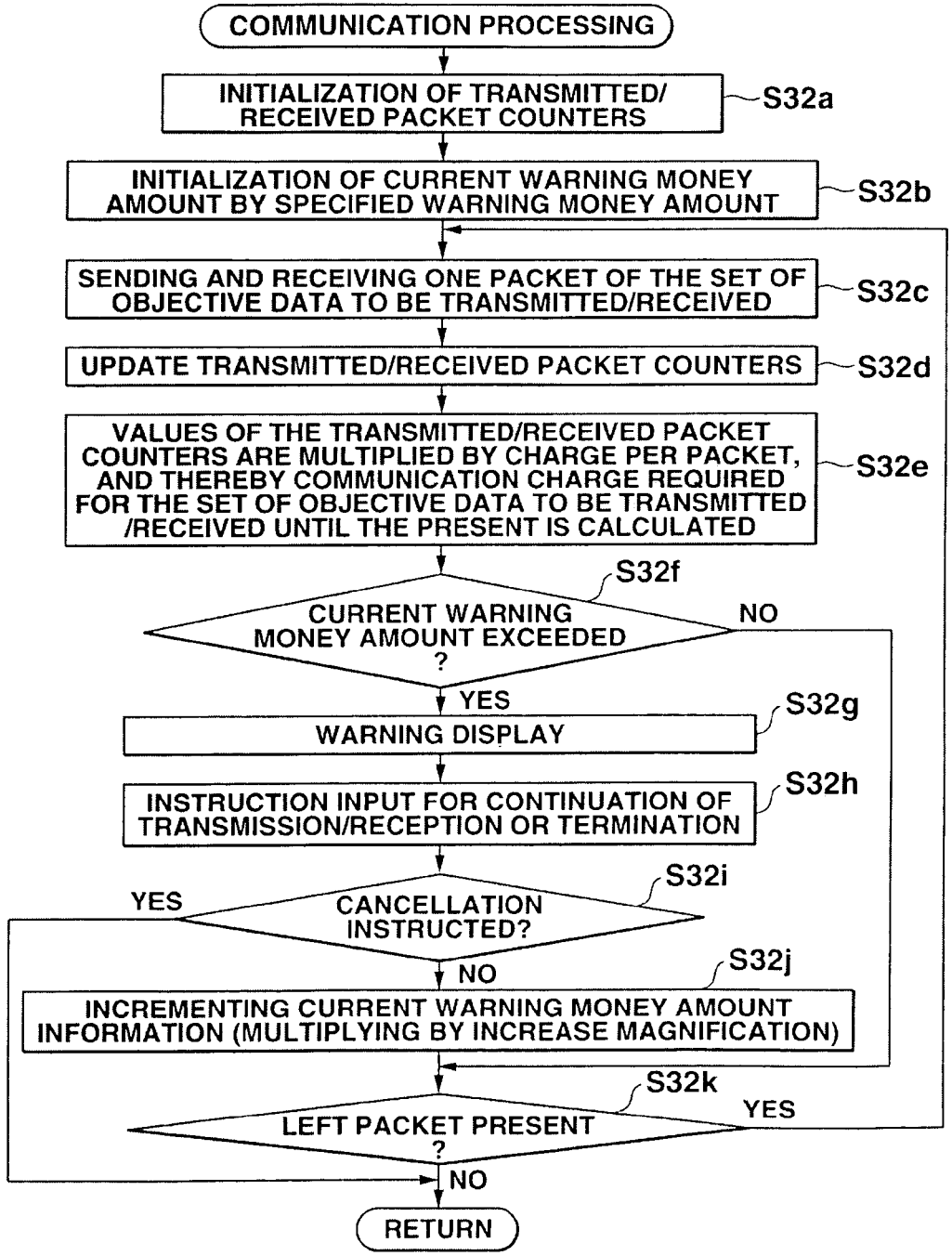

DATA COMMUNICATION TERMINAL FOR CONDUCTING DATA COMMUNICATION FOR A SET OF OBJECTIVE DATA TO BE TRANSMITTED/RECEIVED

CROSS-REFERENCE TO RELATED APPLICATIONS

This application is based upon and claims the benefit of priority from the prior Japanese Patent Application No. 2000-339491, filed Nov. 7, 2000, the entire contents of which are incorporated herein by reference.

BACKGROUND OF THE INVENTION

1. Field of the Invention

The present invention relates to a data communication terminal for conducting data communications by use of a communication network where accounting is carried out according to an amount of transferred data, and a method thereof, and a computer readable recording medium that stores a program including commands which instruct a computer to act as such a data communication terminal.

2. Description of the Related Art

In the prior art, in the accounting methods of communication charges in data communications, there have been an accounting method according to connection time, and an accounting method according to the transmitted/received data amount, and communication charges by these respective methods are accumulated, and charges are demanded to users periodically, for example, an monthly basis or the like.

In order to avoid such a case where a monthly bill for such higher charges as users do not forecast should not be made, connection time or the transmitted/received data amount is calculated at a terminal device of each user, and the accumulative charges are calculated according to the accounting method, and the charges at the moment are displayed at necessity so that each user can see his charges at sight.

A technique that gives a warning to a user in the case when the charge limit set by the user is exceeded is well known. Thereby, a user who has been given such a warning may keep from using connections, and accordingly unexpectedly high charges may be avoided.

In the case of the accounting method according to the transmitted/received data amount, when the amount of data to be transmitted/received continuously is small as in text data, the charges appear smaller than in the case of the accounting method according to connection time, and hence the accounting method according to the transmitted/received data amount is convenient. However, when the amount of data to be transmitted/received continuously is large as in downloading image data, charges will become higher. Especially, in the case of using an extremely high speed communication line, users may transmit/receive a large amount of data without noticing, and as a result, communication charges will become enormous in a short time. If the transmitted/received data is really necessary for a user, then it is all right; on the other hand, if data is unnecessary or valueless, then a user feels it very wasteful, and the cost performance of communications as a whole will be deteriorated, which has been a problem seen with the prior art.

In other words, in the prior art mentioned above, users keep from using further connections when the preset limit amounts are exceeded, so that unexpectedly high charges may be prevented from being issued to users. However, the prior art has failed to improve communication cost performance by reducing receiving and sending of unnecessary data, which has been the problem with the prior art.

BRIEF SUMMARY OF THE INVENTION

Accordingly, in the present invention, when carrying out data communication by connecting a data communication terminal to a communication network where accounting is made according to a data amount, the start and end of transmission/reception of a set of objective data are recognized, and the amount of data transmitted/received from the start to the end of transmission/reception of the set of objective data to be recognized is measured, and it is judged whether or not the measured transmitted/received data reaches a specified data amount, and when it is judged that the transmitted/received data amount has reached the specified data amount, a warning to that effect is given to users.

When carrying out data communication by use of a communication network among a communication network where accounting is made according to the data amount and a communication network where accounting is made according to connection time, the communication charges required for data communication are calculated in real time manners according to the selected communication network, and it is judged whether or not the calculated communication charges reaches the preset limit amount of communication charges, and when it is judged that the calculated communication charge has reached the preset limit amount, an warning to that effect is given to users.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A is a block diagram showing a data communication terminal according to a first embodiment of the present invention.

FIG. 1B is a diagram showing a parameter memory of a RAM in a data communication terminal.

FIG. 3A is a diagram showing a display and setting screen of an account warning.

FIG. 3B is a flowchart for explaining details of warning display and instruction waiting processing in FIG. 5.

FIG. 4 is a flowchart for explaining account warning setting actions in a data communication terminal.

FIG. 5 is a flowchart for explaining details of communication processing in FIG. 2B.

FIG. 6A is a diagram showing a parameter memory of a RAM in a data communication terminal according to a second embodiment of the present invention.

FIG. 6B is a diagram showing an available communication network control table.

FIG. 8A is a diagram showing a parameter memory of a RAM in a data communication terminal according to a third embodiment of the present invention.

FIG. 8B is a flowchart for explaining details of communication processing in the third embodiment of the present invention.

DETAILED DESCRIPTION OF THE INVENTION

Embodiments of the present invention will be explained with reference to FIG. 1A through FIG. 8B.

First Embodiment

Figure 2A:
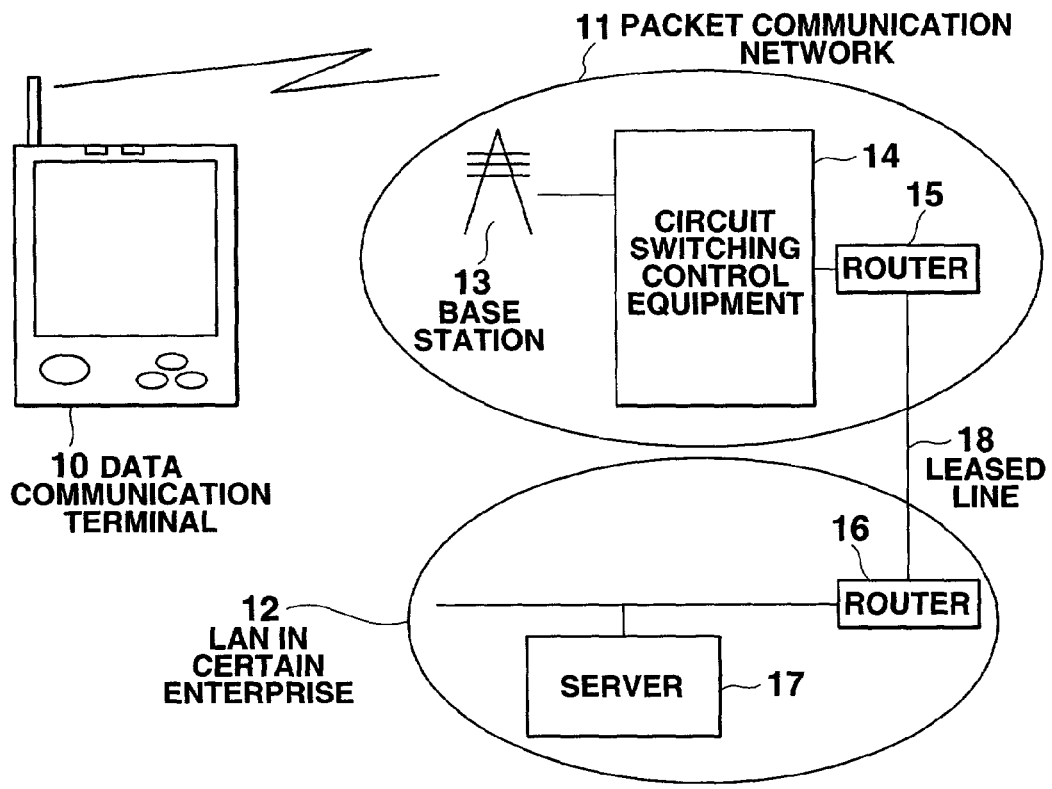
FIG. 2A is a diagram showing an entire system using a data communication terminal according to the first embodiment of the present invention.

FIG. 2A is a diagram showing an entire system using a data communication terminal according to a first embodiment of the present invention.

That is, a data communication terminal 10 according to the first embodiment of the present invention is constituted so as to be connected to a LAN 12 in a certain enterprise where a server is arranged for transmission/reception of data via a packet communication network 11 as a communication infrastructure.

Herein, the data communication terminal 10 is a terminal that has a built-in communication module as mentioned later and thereby enables wireless communications. The packet communication network 11 is provided with a base station 13 for conducting communications with the data communication terminal 10, a circuit switching control equipment 14, and a router 15. While, the LAN 12 in a certain enterprise is provided with a router 16 and a server 17. The router 15 of the packet communication network 11 and the router 16 of the LAN 12 in a certain enterprise are connected with each other via a leased line 18.

By the way, the packet communication network 11 need not be a wireless communication infrastructure, but may be one employing an analog public line and the like.

FIG. 1A is a block diagram showing the data communication terminal 10 according to the first embodiment of the present invention.

That is, this data communication terminal 10 comprises a CPU 20, a ROM 21, a RAM 22, a liquid crystal display device 23, an LCD driver circuit 24, a key matrix 25, a key I/F circuit 26, a communication module 27, and a power source circuit 28.

Herein, the CPU 20 is for carrying out various controls of respective portions in the data communication terminal 10. The ROM 21 is a read only memory for storing a program and the like, and the RAM 22 is a temporary memory for work. The liquid crystal display device 23 is an output device necessary for interface with human beings, while the LCD driver 24 is for driving the liquid crystal display device 23. The key matrix 25 is a touch key matrix arranged on the display screen of the liquid crystal display device 23, and the key I/F circuit 26 is for tap position detection in the key matrix 25. The communication module 27 (which functions as first and second data communication means) carries out data communications by the packet communication network 11. The power source circuit 28 supplies main power source necessary for respective portions, and also provides backup power source to the RAM 22 so as to keep various parameters of warning display to be mentioned later into the RAM 22.

As shown in FIG. 1B, in the RAM 22, areas to store charge information per packet 22A, a warning display flag 22B, a displayed flag 22C, specified warning money amount information 22D, current charge 22E, previous charge 22F, start date information 22G, end date information 22H, a transmitted packet counter 22I, and a received packet counter 22J, as various parameters of the kept warning display, are arranged.

These various parameters are set in a charge warning display and setting screen as shown in FIG. 3A. By the way, this charge warning display and setting screen is also used to give users a warning when a communication charge exceeding user set money amount happens.

That is, the row "charge per packet" has up and down cursors 30 for setting a charge per packet, wherein an amount may be set up and down in increments of 0.01 yen. Tapping the up cursor makes the amount go up by 0.01 yen, while, tapping the down cursor makes the amount go down by 0.01 yen. The money amount is stored into the charge information per packet 22A in the RAM 22.

A check box 31 is a check box for selecting whether or not to carry out account warning display. When account warning display is intended, this check box 31 is checked. When account warning display is not intended, the check box 31 is unchecked. The presence or absence of this check sets or resets the warning display flag 22B of the RAM 22.

The row "specified warning money amount" is for setting a money amount for displaying a warning displayed when the set money amount is exceeded during data communications. There are up and down cursors 32 for setting this money amount of warning, wherein the amount may be set up and down in increments of 1 yen. Clicking the up cursor makes the amount go up by 1 yen, while clicking the down cursor makes the amount go down by 1 yen. In accordance with the charge setting per packet set in the up and down cursors 30, this set warning money amount is displayed as a value calculated by the data amount. In this example shown herein, the warning money amount is 9999 yen, and the data amount corresponding thereto is 124,987.5 KB. This warning money amount (and/or the corresponding data amount) is stored into the specified warning money amount information 22D of the RAM 22.

The row "current charge" is an accumulative display of the communication charge from the previous resetting to the current time. This cannot be set by a user. The accumulative money amount to be calculated according to the amount of data to be transmitted/received during data communications to be described later is stored to the current charge 22E of the RAM 22, and is also displayed in this row. This row as well as the row "specified warning money amount" also displays data amount corresponding to the money amount. In the case of this example, the money amount is 4,300 yen and the data amount is 52,750.0 KB.

The row "reset" 34 is for instructing to convert the current data communication accumulative charge and accumulative data amount into the previous data communication accumulative charge and accumulative data amount. That is, tapping this "reset" 34 clears the current data communication accumulative charge and accumulative data amount. At this moment, the previous charge period is rewritten as below. That is, the previous end date is rewritten into the start date, and today is rewritten into the period end day. These start date and period end date are stored to the start date information 22G and the end date information 22H of the RAM 22, in yy/mm/dd format.

The row "previous charge" is to display the accumulative communication charge from the reset before the last to the previous reset in increments of 1 yen (and the accumulative communication charge is stored into the previous charge 22F of the RAM 22). This row as well as the "specified warning money amount" also displays an accumulative data amount 35 corresponding to the money amount. In this example, the money amount is 999,999 yen and the data amount is 12,499, 998.0 KB. A period 36 until the reset was pressed previously is also displayed.

By the way, at the completion of the display and setting of the account warning, tapping an "OK" 38 at the right top exits this display. In this charge warning display and setting screen, a soft keyboard display 37 is arranged at the bottom for the case of alphanumeric entry.

Other parameters are as shown below. Namely, the displayed flag 22C is a flag for showing whether or not warning display has been already made. The transmitted packet counter 22I is a counter for counting the number of packets of transmitted data, while, the received packet counter 22J is a counter for counting the number of packets of received data.

In the next place, actions with the structure mentioned above will be explained.

FIG. 4 is a flowchart for explaining account warning setting actions in the data communication terminal 10 according to the first embodiment of the present invention. A program that realizes the respective functions listed in this flowchart is stored in the ROM 21 in the format of program codes that a CPU 20 can read. Of course, this program may be read from storage media such as a floppy disk, an optical (magnetic) disk and the like, or may be received by the communication module 27 from an external device, and stored into the RAM 22.

That is, when a user opens the charge warning display and setting screen, the actions shown in this flowchart are started, and first, it is judged whether or not there is a screen tap input by the user (step S11). If there is not a screen tap input, the process jumps to a step S25 to be described later.

On the contrary, if there is a screen tap input, the place of the tapping is judged (step S12).

Herein, when the up cursor on the charge per packet is the place of tapping, the charge information per packet 22A is increased by 0.01 yen (step S13), while, when the down cursor on the charge per packet is the place of tapping, the charge information per packet 22A is decreased by 0.01 yen (step S14).

On the other hand, when the charge warning check box 31 during communications is judged as the place of tapping, the warning display flag 22B is inverted (step S15).

Or, when the specified warning money amount up cursor is judged as the place of tapping, the specified warning money amount information 22D is increased by 1 yen (step S16), while, when the specified warning money amount down cursor is judged as the place of tapping, the specified warning money amount information 22D is decreased by 1 yen (step S17).

When the "reset" 34 is judged as the place of tapping, a specified reset confirmation display (not illustrated) is carried out (step S18), and user confirmation is carried out (step S19). If this user confirmation is "NO", the process jumps to a step 24 to be described later. On the contrary, if the user confirmation is "YES", the previous period end date (end date information 22H) is copied to the period start date (start date information 22G) (step S20), and the date of today is written into the period end date (end date information 22H) (step S21). The current charge 22E is rewritten into the previous charge 22F (step S22), and the current charge 22E is cleared (step S23).

After the processing by the respective places of tapping mentioned above, a display rewriting process is carried out (step S24), and thereby making display in accordance with updated parameters. Thereafter, whether or not to end this charge setting action, i.e., whether or not the "OK" 38 is tapped is judged (step S25), and when the judgment is "NO", then the process goes back to the step S11. While, if the judgment is "YES", then this charge warning setting actions are completed.

Figure 2B:
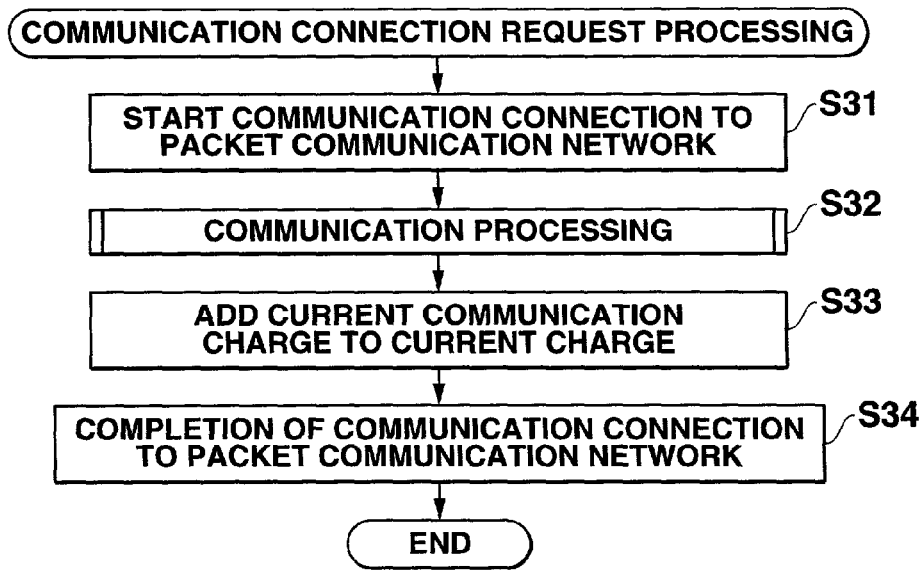
FIG. 2B is a flowchart of communication connection request processing in a data communication terminal.

FIG. 2B is a flowchart of communication connection request processing in the data communication terminal 10.

That is, at a communication connection request from a user, the actions shown in this flowchart get started, and first, communication connection to the packet communication network 11 by the communication module 27 is started (step S31). By communication processing whose details are described later, data is actually transmitted/received (step S32). Thereafter, the current charge is added to the current charge 22E and stored (step S33), and communication connection to the packet communication network 11 is completed (step S34), and this communication connection request processing is finished.

FIG. 5 is a flowchart for explaining details of communication processing at the step S32.

That is, first of all, initial processing is carried out (step S32A), and thereby clearing the transmitted packet counter 22I and the received packet counter 22J, and clearing the displayed flag 22C.

In the next place, it is judged whether or not there is transmitted/received data (obiective data, which is an obiect of transmission/reception) (step S32B), and when there is not, the process jumps to communication completion judgment of a step S32K to be described later.

On the contrary, when there is transmitted/received data, transmitted/received data processing by the communication module 27 is carried out (step S32C). The number of packets transmitted this time is added to the transmitted packet counter 22I (step S32D). In the same manner, the number of packets received this time is added to the received packet counter 22J (step S32E). The value of this transmitted packet counter 22I and the value of the received packet counter 22J are added, and the total value is multiplied by the money amount per packet displayed by the charge information per packet 22A, and thereby the current communication charge is calculated (step S32F).

Thereafter, it is judged whether or not the displayed flag 22C is "0" and the warning display flag 22B is "1" (step S32G), and if it is not so, i.e., if warning display has been already made, or if a user has not set to display warning, the process jumps to communication completion judgment of a step S32K to be described later.

On the other hand, if the displayed flag 22C is "0" and the warning display flag 22B is "1", i.e., if warning display has not been made yet and a user has set to display warning, it is judged whether or not the current communication charge exceeds the specified warning money amount (step S32H). If it does not exceed, then the process jumps to communication completion judgment of a step S32K to be described later.

On the contrary, if the current communication charge exceeds the specified warning money amount, warning display and instruction waiting process whose details are described later is carried out (step S32I), and the displayed flag 22C is set to "1" (step S32J). Thereafter, it is judged whether or not communication is finished (step S32K), and in the case of "NO", the process goes back to the step S32B. In the case of communication completion, this communication process is finished, and the process returns to the upper routine.

FIG. 3B is a flowchart showing the details of warning display and instruction waiting process of the step S32I.

That is, a warning that the communication charge has exceeded the specified warning money amount is made, and at the same time, transmission/reception data is suspended temporarily, a warning display processing is made wherein a message asking a user whether or not to continue communication process is displayed (step S32I1). Together with this warning display, a warning sound such as a buzzer sound or the like may be generated. According to the message, it is judged whether or not the user has selected to continue the communication processing (step S32I2). Herein, when the communication processing is selected to be continued, the process returns to the upper routine, and then goes to the step S32J. On the contrary, when the user has selected not to continue the communication processing, the process jumps to the return destination of the upper routine, that is, the step S33 of the main routine.

In the first embodiment, when a user of a data communication terminal sets the specified warning money amount, a money amount at which the user thinks it is necessary to pay attention in, for example, one time of communication connection is set. Every time when the data communication terminal is connected to a packet communication network, the amount of transmitted/received data from the start to the end of communication connection is counted, and when the communication charge exceeds the set money amount, a warning is made to the user, and at the same time, transmission/reception of data is suspended temporarily. According to instructions from the user, the transmission/reception process is resumed or terminated. Thereby, the user can grasp and control his communication charge per month, and optimize the distribution of daily communication time toward the payment of communication charge at the end of every month.

Second Embodiment

In the next place, explained is a second embodiment of the present invention hereinafter.

In the second embodiment, in addition to the accounting method according to the transmitted/received data amount as in the first embodiment, the accounting method according to connection time may be selected, and further, communication charge is counted not at every time of communication connection but per specified data.

Therefore, in this second embodiment, so as to cope with the accounting method according to connection time, in the RAM 22, an area for storing the parameter of a unit time charge 22M, as shown in FIG. 6A, is arranged in addition to the parameters in the first embodiment.

An available communication network control table 22a is also stored as shown in FIG. 6B. This is a table that stores available communication networks and accounting methods to respective connection destinations.

Figure 7A:
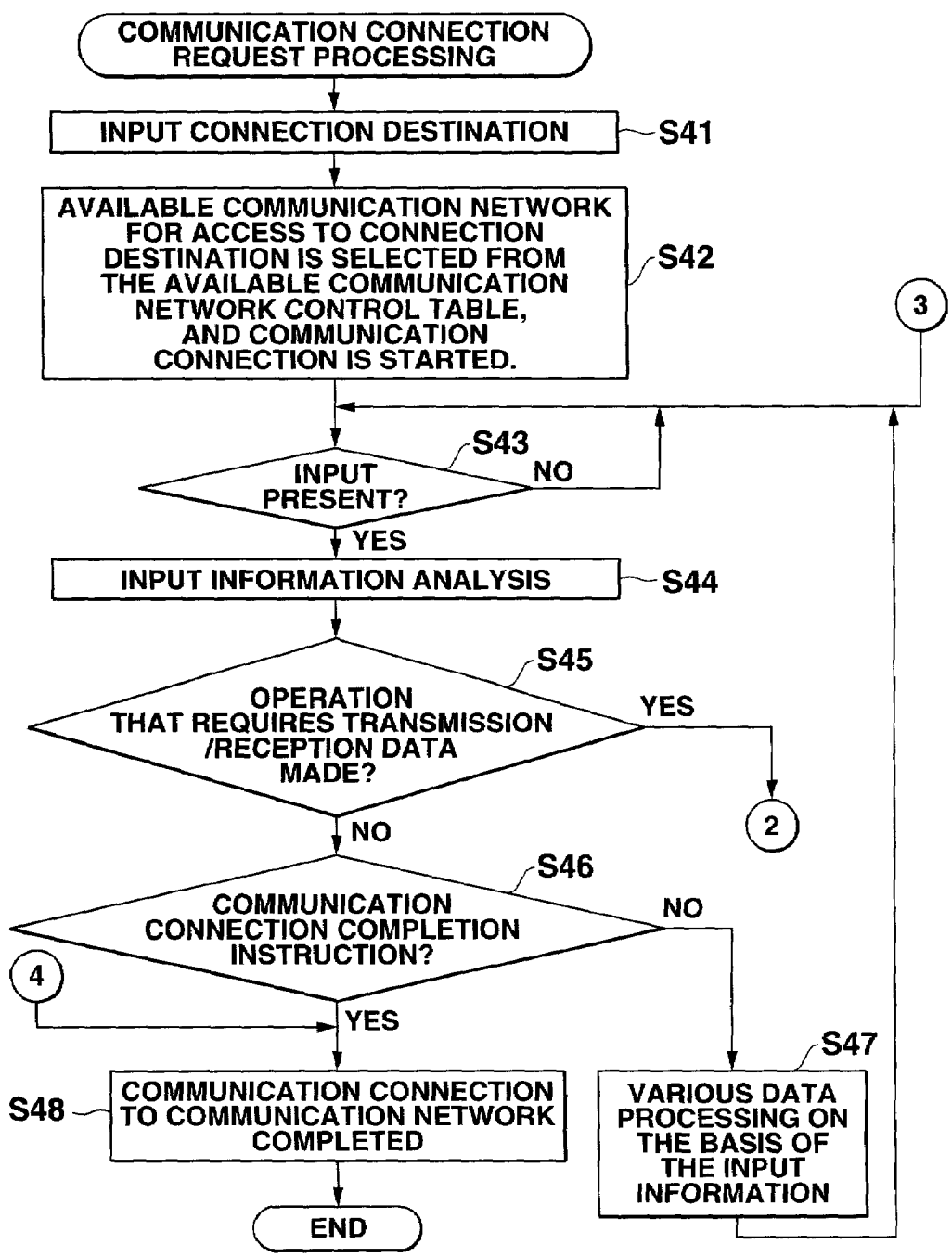
FIG. 7A is a diagram showing the first half of a flowchart for explaining a communication connection request processing.
Figure 7B:
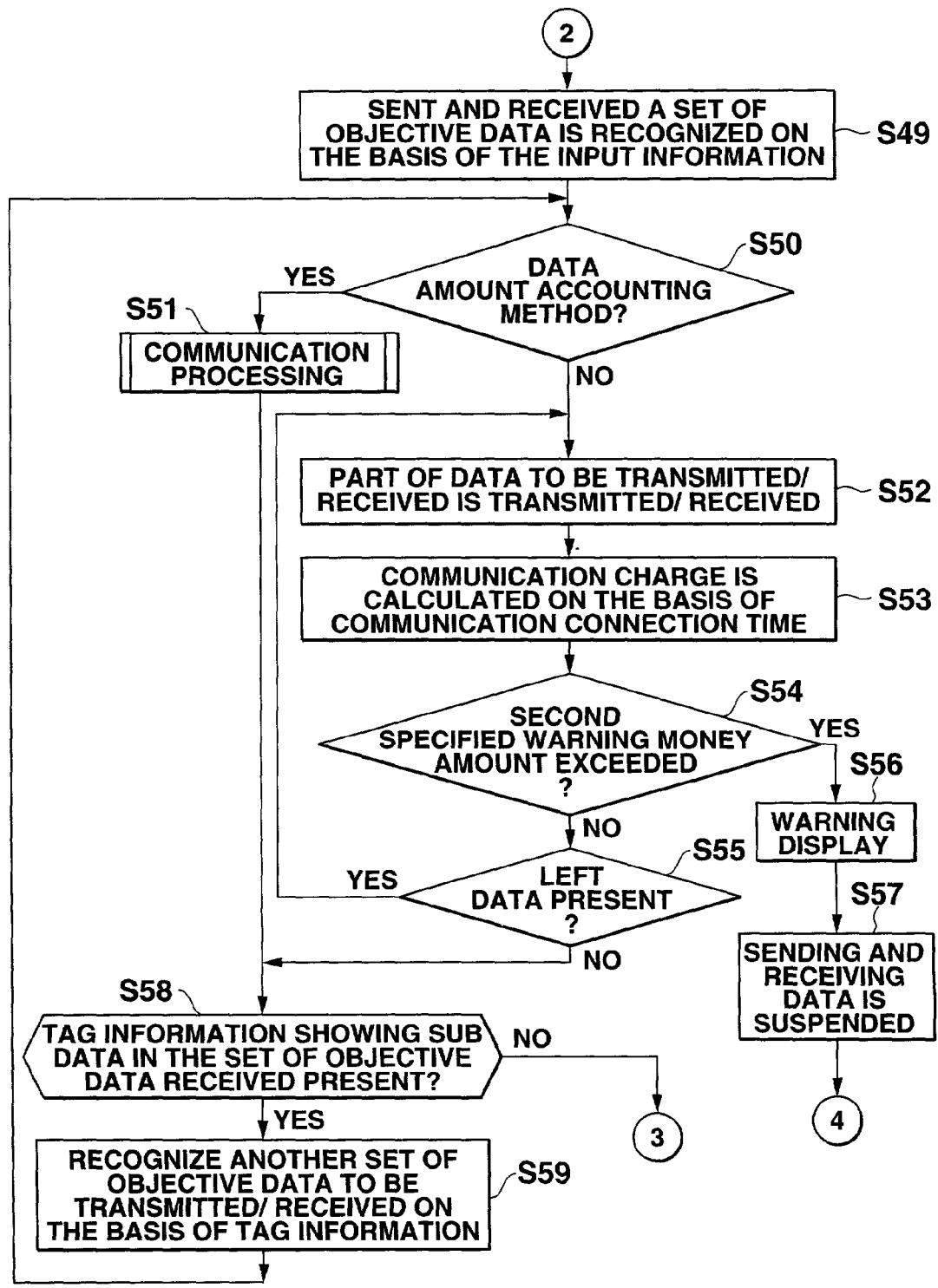
FIG. 7B is a diagram showing the second half of a flowchart for explaining a communication connection request processing.

In this second embodiment, communication connection request processing is as shown in a series of flows illustrated in FIG. 7A and FIG. 7B.

That is, at a communication connection request from a user, the actions shown in this flowchart are started, and first, input of a connection destination by a user is accepted (step S41).

Thereafter, an available communication network for access to the connection destination is selected from the available communication network control table 22a, and communication connection is started by the communication module 27 (step S42).

Then, the process waits for input (step S43), and when there is input, the input information concerned is analyzed (step S44). As the result of the analysis, and it is judged whether or not an operation that requires transmission/reception data of, for example, Web page data reading instruction and the like has been made (step S45), and if not, then further, it is judged whether or not a communication connection completion instruction has been made (step S46). When the communication connection completion instruction has not been made, various data processings are carried out on the basis of the input information (step S47), and the process returns to the step S43. When it is judged that the communication connection completion instruction has been made, communication connection to a communication network is completed (step S48), and this communication connection request processing is finished.

On the other hand, in the step S45, when it is judged that an operation requiring transmission/reception data has been made, a set of objective data to be transmitted/received is recognized on the basis of the input information (step S49). For example, when reading Web page data is instructed, it is recognized in which URL web page data should be read. By the available communication network control table 22a, it is judged whether or not the accounting method in the current connection destination and communication network is data amount accounting method (step S50). Herein, if it is the case of data amount accounting method, the same communication processing as in the aforementioned first embodiment is carried out (step S51), for example, in the example of the Web page data, one screen data of Web page data at the specified URL is read as a set of objective data to be transmitted/received. Thereafter, it is checked whether or not there is tag information showing sub data in the set of objective data received in this step S51 (step S58), and when there is tag information showing sub data, then another set of objective data to be transmitted/received is recognized once again according to the tag information (step S59). For example, in the example of the Web page data, if there is tag information showing image data in the Web page data, it is recognized in which file the image data to be downloaded is stored on the basis of the tag information.

Thereafter, the process goes back to the step S50, and the specified accounting method is judged once again, and the set of sub data is transmitted/received according to the communication processing corresponding to the accounting method. In the example of the Web page data, the recognized image data file is transmitted/received. At this moment, so as for a user to know that the image data file is now being transmitted/received, a specified icon is displayed at the position where the tag information in the Web page display screen is set. Sending and receiving the set of sub data continues until any tag information showing other sub data disappears in the Web page data. If there is not tag information showing sub data in the step S58, the process goes back to the step S43, and input waiting status gets in once again.

In the step S50, if the accounting method is judged as not the data amount accounting method but the connection time accounting method, part of data to be transmitted/received is transmitted/received (step S52). Thereafter, on the basis of the communication connection time and the unit time charge stored in the unit time charge 22M, communication charge is calculated (step S53). It is judged whether or not the calculated communication charge exceeds a second specified warning money amount corresponding to the connection time accounting method stored in the specified warning money amount information 22D (step S54), and if it does not exceed, further it is judged whether or not there is data left (step S55). Herein, if there is data left, the process goes on to the step S52, while if there is not data left, the process goes on to the step S58.

In the step S54, if it is judged that the calculated communication charge has exceeded the specified warning money amount, after a warning is displayed (step S56), transmission/reception data is suspended without waiting for instruction from a user (step S57). The process goes on to the step S48, and communication connection to the communication network is finished, and this communication connection request processing is completed. By the way, the warning display in the second embodiment is made by a message to notify communication charge from the start of transmission/reception specified data, in the place of a message to notify communication charge from the start of connection as shown in FIG. 3B.

In the second embodiment, a set of objective data to be transmitted/received is recognized on the basis of input instruction from a user, or tag information showing sub data included in data, and the amount of data transmitted/received is counted per the data to be transmitted/received and to be recognized. When the communication charge exceeds a preset warning money amount, a warning is given to the user, and at the same time, transmission/reception data is suspended temporarily, and waiting status gets in. According to instructions from the user, the transmission/reception process is resumed or terminated. Thereby, the user can grasp and control his communication charge every individual transmission/reception objective data. Even when communication speed is very high, the user can judge the importance degree of the data now being transmitted/received, and instruct whether or not to continue transmission/reception, before transmission/reception a great amount of unnecessary data, thereby user can prevent wasteful communication charge, and carry out effective data communications.

Third Embodiment

A third embodiment of the present invention will be explained hereinafter.

In the third embodiment, as shown in FIG. 8A, areas for storing parameters of current warning money amount information 22K and warning money amount increase magnification 22L are provided in the RAM 22.

The communication processing carried out in the step S51 in the second embodiment is made as shown in FIG. 8B.

That is, first the transmitted/received packet counters 22I and 22J are initialized (step S32a), and further, the current warning money amount information 22K is initialized by the specified warning money amount stored in the specified warning money amount information 22D (step S32b).

The transmission/reception object data recognized in the step S49 or the step S59 in the second embodiment is transmitted/received by one packet (step S32c), and the transmitted/received packet counters 22I and 22J are updated accordingly (step S32d). Thereafter, the values of the transmitted/received packet counters 22I and 22J are multiplied by the charge per packet stored in the charge information per packet 22A, and thereby communication charge required for the data to be transmitted/received until the present is calculated (step S32e). It is judged whether or not the calculated communication charge has exceeded the current warning money amount stored in the current warning money information 22K (step S32f). Herein, if it has not exceeded, the process jumps to a step S32k to be described later.

On the contrary, if the communication charge has exceeded the current warning money amount, a warning is displayed (step S32g), and an instruction input for continuation of transmission/reception or termination from a user corresponding thereto is received (step S32h), and it is judged whether or not termination has been instructed (step S32i). Herein, if termination has been instructed, this communication processing is finished, and the process returns to the upper routine.

When receiving continuation is instructed, the current warning money amount stored in the current warning money amount information 22K is incremented (step S32j). Namely, the current warning money amount is multiplied by the increase magnification stored in the warning money amount increase magnification 22L, and the result attained is overwritten to the current warning money amount information 22K. Thereafter, it is judged whether or not there is a packet concerning the data to be transmitted/received left (step S32k), and if there is still a packet left, then the process goes back to the step S32c. Then, when there is no packet left, this communication processing is finished, and the process goes back to the upper routine. With regard to the judgment whether or not there is a packet concerning the data to be transmitted/received left in the step S32k, for example, data identification information contained in each packet data of a set of objective data to be transmitted/received comprising plural packets is investigated, and thereby when packet data having identical identification information continues, then it is judged that there is still a packet left therein.

In the third embodiment, in addition to the second embodiment, after a warning of communication charge, if a user instructs to continue transmission/reception data, the warning money amount is increased automatically, and transmission/reception the set of objective data to be transmitted/received is continued. Thereby, even when the data amount and importance degree of the set of objective data to be transmitted/received is not clear, data is transmitted/received continuously anyway, and when the data transmitted/received amount increases further, user may judge whether to continue or terminate communication, therefore, it is possible to conduct further effective data communications.

The present invention has been explained in reference to the preferred embodiments, however, it is well known that the present invention is not limited to the embodiments described above, and various modifications and applications are possible without departing from the spirit thereof.

For example, the preferred embodiment has been explained with the data amount in the data amount accounting method as packet, while calculation may be made by bytes according to an account unit. In this case, the charge information per packet 22A, the transmitted packet counter 22I, and the received packet counter 22J may be set as charge per byte information, transmitted byte counter, and received byte counter, as shown in parentheses in FIG. 1B, and the packet in each flowchart may be read as byte. The communication processing flow of the third embodiment may be employed in an actual communication processing to be conducted in the communication connection request processing flow of the first embodiment, and the communication processing flow of the first embodiment may be employed in an actual communication processing to be conducted in the communication connection request processing flow of the second embodiment. In the second embodiment, consideration has been made with a processing in the case where the tag information showing sub data is contained in the data to be transmitted/received and to be recognized on the basis of the input information, while in the case when it is known in advance that there is no sub data, the processings in the step S58 and the step S59 may be skipped, and the process may be set to return directly to the step S43. Further, instead of ending communication connection immediately after stopping transmission/reception data in the step S57, the process may be set to go back to the step S43 and wait for instruction to transmit/receive next data. In the present embodiments, a warning is set to be made when a specified warning money amount is exceeded, while a warning may be set as to made when the amount of transmitted/received data per unit time exceeds a certain amount.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data communication terminal comprising:
    first data communication means for carrying out data communication via a first communication network in which accounting is made according to a transmitted/received data amount;
    second data communication means for carrying out data communication via a second communication network in which accounting is made according to a connection time;
    first calculating means for calculating a communication charge according to the transmitted/received data amount of the data communication carried out by the first data communication means;
    second calculating means for calculating a communication charge according to the connection time of the data communication carried out by the second data communication means;
    limit amount setting means for setting a communication charge limit amount for a set of objective data to be transmitted/received;
    selected communication means for selecting one of the first data communication means and the second data communication means to carry out data communication;
    judging means for selecting one of the first and second calculating means to calculate the communication charge for the data communication carried out by the selected one of the first and second data communication means, and for judging whether the calculated communication charge has reached the communication charge limit amount; and
    warning means for, when the judging means judges that the calculated communication charge has reached the communication charge limit amount, warning a user that the communication charge has reached the communication charge limit amount.

2. A data communication terminal comprising:
    first data communication means for carrying out data communication via a first communication network in which accounting is made according to a transmitted/received data amount;
    second data communication means for carrying out data communication via a second communication network in which accounting is made according to a connection time;
    first calculating means for calculating a communication charge according to the transmitted/received data amount of the data communication carried out by the first data communication means;
    second calculating means for calculating a communication charge according to the connection time of the data communication carried out by the second data communication means;
    limit amount setting means for setting a communication charge limit amount for a set of objective data to be transmitted/received;
    selected communication means for selecting one of the first data communication means and the second data communication means to carry out data communication;
    judging means for selecting one of the first and second calculating means to calculate the communication charge for the data communication carried out by the selected one of the first and second data communication means, and for judging whether the calculated communication charge has reached the communication charge limit amount; and
    warning means for, when the judging means judges that the calculated communication charge has reached the communication charge limit amount: (i) warning a user that the communication charge has reached the communication charge limit amount, and (ii) temporarily suspending the data communication to wait for an instruction from the user if the data communication is carried out by the first communication means, and immediately terminating the data communication if the data communication is carried out by the second communication means.

3. A computer-readable recording medium having stored thereon a program for controlling a computer of a data communication terminal, which carries out data communication using one of a first communication network in which accounting is made according to a transmitted/received data amount and a second communication network in which accounting is made according to a connection time, the program controlling the computer to carry out functions comprising:
    setting a communication charge limit amount for a set of objective data to be transmitted/received;
    selecting one of the first data communication network and the second data communication network to carry out data communication;
    calculating a communication charge of the data communication carried out by the selected one of the first and second data communication networks;
    judging whether the calculated communication charge has reached the communication charge limit amount; and
    when it is judged that the calculated communication charge has reached the communication charge limit amount, warning a user that the communication charge has reached the communication charge limit amount.

4. A computer-readable recording medium having stored thereon a program for controlling a computer of a data communication terminal, which carries out data communication using one of a first communication network in which accounting is made according to a transmitted/received data amount and a second communication network in which accounting is made according to a connection time, the program controlling the computer to carry out functions comprising:
    setting a communication charge limit amount for a set of objective data to be transmitted/received;
    selecting one of the first data communication network and the second data communication network to carry out data communication;
    calculating a communication charge of the data communication carried out by the selected one of the first and second data communication networks;

judging whether the calculated communication charge has reached the communication charge limit amount; and when it is judged that the calculated communication charge has reached the communication charge limit amount: (i) warning a user that the communication charge has reached the communication charge limit amount, and (ii) temporarily suspending the data communication to wait for an instruction from the user if the data communication is carried out by the first communication network, and immediately terminating the data communication if the data communication is carried out by the second communication network.

* * * * *